United States Patent

Treuner et al.

[11] 3,929,776
[45] Dec. 30, 1975

[54] 3-HETEROTHIO DERIVATIVES OF [(THIOALKOXYCARBONYL)THIOACETYL]CEPHALOSPORINS

[75] Inventors: Uwe D. Treuner; Hermann Breuer, both of Regensburg, Germany

[73] Assignee: E. R. Squibb & Sons, Inc., Princeton, N.J.

[22] Filed: May 10, 1974

[21] Appl. No.: 468,727

[52] U.S. Cl.... 260/243 C; 260/294.8 E; 260/329 S; 260/347.2; 260/455 R; 424/246
[51] Int. Cl.² .............. C07D 501/50; A61K 31/545
[58] Field of Search .................................. 260/243 C

[56] References Cited
UNITED STATES PATENTS
3,812,116  5/1974  Takano et al. ................... 260/243 C
FOREIGN PATENTS OR APPLICATIONS
2,241,250  3/1973  Germany ......................... 260/243 C OTHER PUBLICATIONS
Sassiver et al., Antimicrobial Agents & Chemeotherapy 1968, pp. 101–108 (1969).
Lewis et al., Antimicrobial Agents & Chemeotherapy 1968, pp. 109–114 (1969).

*Primary Examiner*—Nicholas S. Rizzo
*Assistant Examiner*—Diana G. Rivers
*Attorney, Agent, or Firm*—Lawrence S. Levinson; Merle J. Smith

[57] ABSTRACT

3-Alkylthio- and 3-heterothio derivatives of [(thioalkoxycarbonyl)thioacetyl]cephalosporins having the general formula

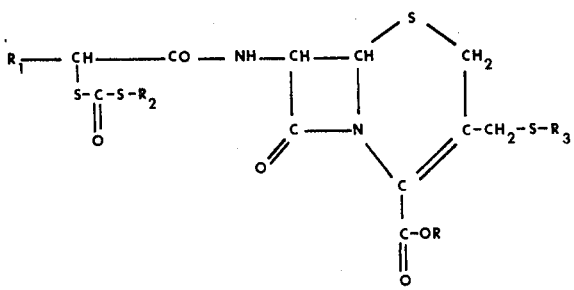

wherein R is hydrogen, lower alkyl, phenyl, phenyl-lower alkyl, tri(lower alkyl)stannyl, tri(lower alkyl)silyl, a salt forming ion or the group

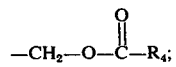

$R_1$ is hydrogen, lower alkyl, phenyl, pyridyl, thienyl or furyl; $R_2$ is lower alkyl, $R_3$ is lower alkylthio or a five-membered heterocycle containing only nitogen and carbon or nitrogen, carbon and sulfur in the ring; $R_4$ is lower alkyl, phenyl or phenyl-lower alkyl; are useful as antibacterial agents.

10 Claims, No Drawings

3-HETEROTHIO DERIVATIVES OF [(THIOALKOXYCARBONYL)THIOACETYL]-CEPHALOSPORINS

SUMMARY OF THE INVENTION

This invention relates to new 3-alkylthio- and 3-heterothio derivatives of [(thioalkoxycarbonyl)thioacetyl]cephalosporins having the formula

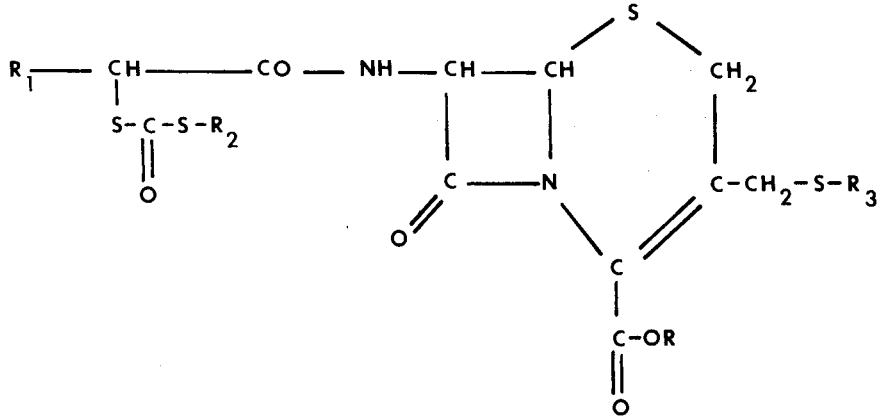

R represents hydrogen, lower alkyl, phenyl-lower alkyl, tri(lower alkyl)stannyl, tri(lower alkyl)silyl, a salt forming ion or the group

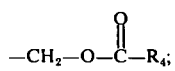

$R_1$ represents hydrogen, lower alkyl, phenyl, pyridyl, thienyl or furyl; $R_3$ represents lower alkyl or a five membered heterocyclic ring system including thiadiazolyl, (lower alkyl)thiadiazolyl, triazolyl, tetrazolyl or (lower alkyl)tetrazolyl; $R_2$ represents lower alkyl; and $R_4$ represents lower alkyl, phenyl or phenyl-lower alkyl.

The preferred members within each group are as follows: R is hydrogen, lower alkyl, alkali metal, trimethylsilyl, benzhydryl, or

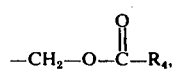

especially hydrogen, methyl, pivaloyloxymethyl, sodium or potassium; $R_1$ is hydrogen, lower alkyl or phenyl, especially hydrogen or phenyl; $R_2$ is lower alkyl, especially methyl or ethyl; $R_3$ is lower alkyl, especially methyl, (lower alkyl)thiadiazolyl or (lower alkyl)tetrazolyl; and $R_4$ is methyl or t-butyl.

DETAILED DESCRIPTION OF THE INVENTION

The various groups represented by the symbols have the meanings defined below and these definitions are retained throughout this specification.

The lower alkyl groups are the straight and branched chain hydrocarbon groups in the series from methyl to heptyl, methyl and ethyl being preferred.

The phenyl-lower alkyl radicals include a phenyl ring attached to a lower alkyl group of the kind described above as well as those containing two phenyl groups such as benzhydryl.

The salt forming ions represented by R are metal ions, e.g., alkali metal ions such as sodium or potassium, alkaline earth metal ions such as calcium or magnesium, or an amine salt ion, e.g., a (lower alkyl)amine like methylamine or triethylamine, etc.

The heterocyclic groups represented by $R_3$ are the five membered nitrogen heterocyclics thiadiazole, triazole, tetrazole and their lower alkyl substituted analogs including 1,2,4-thiadiazol-5-yl, 1,2,4-thiadiazol-3-yl, 1,3,4-thiadiazol-2-yl, 1,2,4-triazol-3-yl, 1,2,3-triazol-4-yl, tetrazolyl as well as these radicals bearing a lower alkyl group, especially methyl.

The new 3-alkyl- and 3-heterothio-[(thioalkoxycarbonyl)thioacetyl]cephalosporins of this invention are produced by reacting a 7-aminocephalosporanic acid compound of the formula

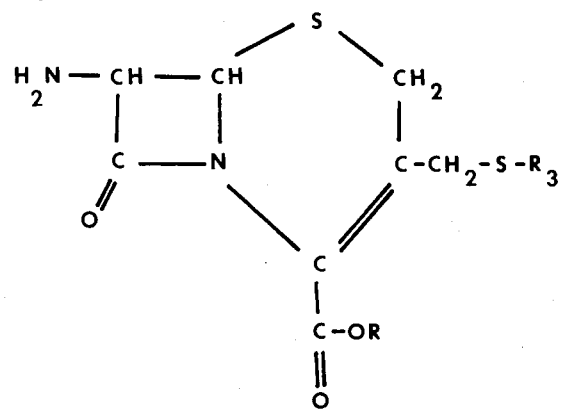

with a [(thiocarbonyl)thio]acetic acid of the formula (III) 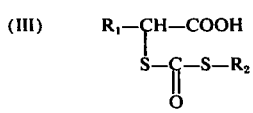

or an activated derivative of the former (II).

The activated derivatives referred to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between the 7-aminocephalosporanic acid compound and the [(thiocarbony)thio]acetic acid is effected, for example, by dissolving or suspending the latter or its acid chloride or acid anhydride in an inert organic solvent such as chloroform, acetone, tetrahydrofuran, methylene chloride, dioxane, benzene or the like, and adding, at a reduced temperature of about 0-5°C, about an equimolar amount of the 7-ACA compound. An activating compound such as dicyclohexylcarbodiimide may be used. The product of the reaction is then isolated by conventional procedures, e.g., by concentration or evaporation of the solvent. The acid chloride is obtained from the acid of formula III by reaction with a chlorinating agent like thionyl chloride. If a derivative of the 7-aminocephalosporanic acid compound, such as the benzhydryl ester is used, the free acid is obtained by hydrolysis, e.g., with trifluoroacetic acid or the like. Salts are then derived from the free acid.

The 7-ACA derivative of formula II is produced by reacting 7-ACA or its derivative (wherein R has the other meanings described above) with a mercaptan HS—$R_3$ at a pH of about 8 – 8.5. This reaction can also be effected after acylation of 7-ACA with the [(thiocarbonyl)thio]acetic acid of formula III. The starting material for the latter sequence are described in our copending application Ser. No. 468,717, filed May 10, 1974.

When R is the acyloxymethyl group

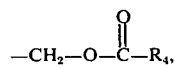

this group may be introduced into the 7-aminocephalosporanic acid moiety prior to the reaction with the [(thiocarbonyl)thio]acetic acid or the activated derivative by treatment with one to two moles of a halomethyl ester of the formula (IV) hal-$CH_2OCOR_4$ wherein hal is halogen, preferably chlorine or bromine, in an inert organic solvent such as dimethylformamide, acetone, dioxane, benzene or the like, at about ambient temperature or below.

The [(thiocarbonyl)thio]acetic acid of formula III is produced by reacting a mercaptoacetic acid of the formula (V) 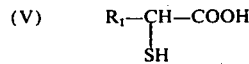

with a diazomethane like diphenyldiazomethane to obtain its ester like the benzhydryl ester. This is then made to react with a chloroformic acid thioester of the formula (VI) 

and the ester group is then removed, e.g., by hydrolysis, such as treatment with trifluoroacetic acid. This is then used for the acylation of the 7-aminocephalosporanic acid compound of formula II.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephradine and other cephalosporins. For example, a compound of formula I or a physiologically acceptable salt thereof may be used in various animal species in an amount of about 1 to 75 mg/kg, daily, orally or parenterally, in single or two to four divided doses to treat infections of bacterial origin, e.g., 4.0 mg/kg in mice.

Oral forms give prompt high blood levels which are maintained for relatively long periods.

Up to about 600 mg. of a compound of formula I or a physiologically acceptable salt thereof can be incorporated in an oral dosage form such as tablets, capsules or elixirs or in an injectable form in a sterile aqueous vehicle prepared according to conventional pharmaceutical practice.

They are also useful in cleaning or disinfecting compostions, e.g., for cleaning barns or dairy equipment, at a concentration of about 0.01 to 1% by weight of such compounds admixed with, suspended or dissolved in conventional inert dry or aqueous carriers for application by washing or spraying. They are further useful as nutritional supplements in animal feeds.

The following examples are illustrative of the invention. All temperatures are in degrees celsius. Additional variations are produced in the same manner by appropriate substitution in the starting material.

EXAMPLE 1

DL-α-Mercaptophenylacetic acid, benzhydryl ester 9.0 gms. (50 mM) of DL-α-mercaptophenylacetic acid are dissolved in 25 ml. of absolute dioxane. A solution of 11 gms. (55 mM) of diphenyldiazomethane and 20 ml. of dioxane are added dropwise, with stirring. The reaction is exothermic. The mixture is stirred for an additional 30 minutes and the solvent is evaporated in vacuum. The residual yellow oil is washed with ether and left to crystallize. Recrystallization from cyclohexane yields 12 gms. of light yellow crystals, DL-α-mercaptophenylacetic acid, benzhydryl ester, m.p. 86°–87°.

EXAMPLE 2

DL-2-[[(Methylthio)carbonyl]thio]phenylacetic acid, benzhydryl ester 3.34 gms. (10 mM) of DL-α-mercaptophenylacetic acid, benzhydryl ester are dissolved together with 1.01 gm. (10 mM) of triethylamine in 25 ml. of chloroform and, while cooling, 1.1 gm. (10 mM) of chloroformic acid thiomethyl ester are added. After stirring for 1 hour, 25 ml. of water are added and the mixture is shaken well. The chloroform phase is dried over sodium sulfate and after evaporating the solvent in vacuum, the DL-2-[(methylthiocarbonyl)thio]phenylacetic acid, benzhydryl ester forms as a light oil which crystallizes after trituration. Recrystallization from cyclohexane yields 3.1 gms. of white crystals, m.p. 108°–110°.

EXAMPLE 3

DL-2-[[(Methylthio)carbonyl]thio]phenylacetic acid 2.04 g. (5 mM) of DL-2-[(methylthiocarbonyl)thio]-phenylacetic acid, benzhydryl ester are stirred for 10 minutes in a mixture of 15 ml. of trifluoroacetic acid and 1 ml. of anisole at 0°–5°. This is then evaporated to dryness and the residue is dissolved in ether. The ether solution is shaken 3 times with dilute aqueous sodium bicarbonate solution. The water phase is acidified with 2N hydrochloric acid and extracted twice, each with 20 ml. of ether. After drying over sodium sulfate and evaporating the ether in vacuum, DL-2-[(methylthiocarbonyl)thio]phenylacetic acid forms as a colorless oil which, after trituration with petroleum ether, crystallizes. Recrystallization from cyclohexane/benzene yields 0.9 gms. of white crystals, m.p. 101°–102°.

EXAMPLE 4

3-[[(5-Methyl-1,3,4-thiadiazol-2-yl)thio]methyl]-7-amino-8-oxo-5-thia-1-azabicyclo[4.2.0]oct-2-ene-2-carboxylic acid A mixture of 13.6 g. (0.05 M) of 7-aminocephalosporanic acid in 100 ml. of water and 50 ml. of acetone are brought to pH 8 with sodium hydroxide while stirring. 9.8 g. (0.57 M) of 3-methyl-1,3,4-thiadiazole-5-thiol are added and the mixture is heated at 80° for 4 hours. After cooling to 5°, this is acidified to pH 3.5 with dilute hydrochloric acid and stirred for 15 minutes. The precipitated solid is filtered under suction and washed with acetone. This 3[[(5-methyl-1,3,4-thiadiazol-2-yl)thio]methyl]-7-amino-8-oxo-5-thia-1-azabicyclo[4.2.0]oct-2-ene-2-carboxylic acid is purified by dissolving in sodium bicarbonate solution and reprecipitating with 2N hydrochloric acid; yield 12.7 g., m.p. 206°.

EXAMPLE 5

By substituting 3-methyl-1,2,4-thiadiazole-5-thiol for the 2-methyl-1,3,4-thiadiazole-5-thiol in the procedure of Example 4, 11.6 g. of 3-[[(3-methyl-1,2,4-thiadiazol-5-yl)thio]methyl]-7-amino-8-oxo-5-thia-1-azabicyclo[4.2.0]oct-2-ene-2-carboxylic acid, m.p. 186° (dec.) are obtained.

EXAMPLE 6

By substituting 1-methyl-1H-tetrazole-5-thiol for the 2-methyl-1,3,4-thiadiazole-5-thiol in the procedure of Example 4, 3-[[(1-methyl-1H-tetrazol-5-yl)thio]methyl]-7-amino-8-oxo-5-thia-1-azabicyclo[4.2.0]oct-2-ene-2-carboxylic acid is obtained.

EXAMPLE 7

DL-7β-[[[(Methylthio)carbonyl]thio]phenylacetyl]amino]-3-[[(1-methyl-1H-tetrazol-5-yl)thio]methyl]-8-oxo-5-thia-1-azabicyclo[4.2.0]oct-2-ene-2-carboxylic acid 6.4 gms. (20 mM) of the product of Example 6 are suspended in 20 ml. of water/acetone (1:1) and 4.5 gms. of sodium bicarbonate are added. The mixture is stirred until a clear solution results. 4.2 gms. (21 mM) of DL-2-[[(methylthio)carbonyl]thio]phenylacetic acid chloride (obtained by stirring the acid for 6 hours in thionyl chloride and then distilling the excess thionyl chloride off in vacuum) dissolved in 20 ml. of acetone are added during cooling. After the addition of the solution, the mixture is stirred for 1 hour at room temperature. The insoluble products are then filtered off and the acetone is evaporated in a rotary evaporator. The aqueous solution is then adjusted to pH 2 with 2 N hydrochloric acid while cooling with ice and extracted twice with 50 ml. portions of ethyl acetate. The ethyl acetate phase is treated with charcoal, filtered and dried over sodium sulfate. After evaporating the solvent, a firm light yellow foam is obtained which weighs 2.8 gms. After recrystallization with methylene chloride/ether/petroleum ether, the pure product DL-7β-[[[[(methylthio)carbonyl]thio]phenylacetyl]amino]-3-[[(1-methyl-1H-tetrazol-5-yl)thio]methyl]-8-oxo-5-thia-1-azabicyclo[4.2.0]oct-2-ene-2-carboxylic acid is obtained, yield: 1.1 gm., m.p. 89°–90°.

EXAMPLE 8

DL-7β-[[[[(Methylthio)carbonyl]thio]phenylacetyl]amino]-3-[[(1-methyl-1H-tetrazol-5-yl)thio]methyl]-8-oxo-5-thia-1-azabicyclo[4.2.0]oct-2-ene-2-carboxylic acid, potassium salt The potassium salt of the product of Example 7 is obtained by dissolving the acid in a molecular equivalent amount of aqueous potassium bicarbonate solution and freeze drying.

The following additional examples are obtained by the procedure of Examples 4 and 7, by substituting for the 2-methyl-1,3,4-thiadiazole-5-thiol in Example 4, the thiol indicated by the 3-substituent, and for the DL-2-[[(methylthio)carbonyl]thio]phenylacetic acid chloride in Example 7, the acid chloride indicated by the 7-substituent:

Example

9: DL-3-[[(1,3,4-thiadiazol-2-yl)thio]methyl]-7β-[2-[[[(methylthio)carbonyl]thio]phenylacetyl]amino]-8-oxo-5-thia-1-azabicyclo[4.2.0]oct-2-ene-2-carboxylic acid.

10: DL-3-[[(1,3,4-thiadiazol-2-yl)thio]methyl]-7β-[2-[[[(ethylthio)carbonyl]thio]phenylacetyl]amino]-8-oxo-5-thia-1-azabicyclo[4.2.0]oct-2-ene-2-carboxylic acid.

11: DL-3-[[(5-ethyl-1,3,4-thiadiazol-2-yl)thio]methyl]-7β-[2-[[[(n-butylthio)carbonyl]thio]phenylacetyl]amino]-8-oxo-5-thia-1-azabicyclo[4.2.0]oct-2-ene-2-carboxylic acid and sodium salt.

12: DL-3-[[(5-methyl-1,3,4-thiadiazol-2-yl)thio]methyl]-7β-[[[(methylthio)carbonyl]thio]acetyl]amino]-8-oxo-5-thia-1-azabicyclo[4.2.0]oct-2-ene-2-carboxylic acid and potassium salt.

13: DL-3-[[(1,2,4-triazol-3-yl)thio]methyl]-7β-[2-[[[(methylthio)carbonyl]thio]phenylacetyl]amino]-8-oxo-5-thia-1-azabicyclo[4.2.0]oct-2-ene-2-carboxylic acid.

14: DL-3-[[(5-methyl-1,2,4-triazol-3-yl)thio]methyl]-7β-[2-[[[(methylthio)carbonyl]thio]phenylacetyl]amino]-8-oxo-5-thia-1-azabicyclo[4.2.0]oct-2-ene-2-carboxylic acid.

15: DL-3-[[(1,2,3-triazol-5-yl)thio]methyl]-7β-[2-[[[(ethylthio)carbonyl]thio]-2-(2-thienyl)acetyl]amino]-8-oxo-5-thia-1-azabicyclo[4.2.0]oct-2-ene-2-carboxylic acid.

16: 3-[[(1-methyl-1,2,3-triazol-5-yl)thio]methyl]-7β-[2-[[[(methylthio)carbonyl]thio]acetyl]amino]-8-oxo-5-thia-1-azabicyclo[4.2.0]oct-2-ene-2-carboxylic acid.

17: DL-3-[[(1H-tetrazol-5-yl)thio]methyl]-7β-[[[[(methylthio)carbonyl]thio]phenylacetyl]amino]-8-oxo-5-thia-1-azabicyclo[4.2.0]oct-2-ene-2-carboxylic acid.

18: DL-3-[[(1-ethyl1H-tetrazol-5-yl)thio]methyl]-7β-[[[[(methylthio)carbonyl]thio]acetyl]amino]-8-oxo-5-thia-1-azabicyclo[4.3.0]oct-2-ene-2-carboxylic acid, trimethylsilyl ester.

19: DL-3-[[(1,2,4-triazol-3-yl)thio]methyl]-7β-[2-[[[(methylthio)carbonyl]thio]-2-(2-furyl)acetyl]amino]-8-oxo-5-thia-1-azabicyclo[4.2.0]oct-2-ene-2-carboxylic acid.

20: DL-3-[[(5-methyl-1,3,4-thiadiazol-2-yl)thio]methyl]-7β-[[[[(methylthio)carbonyl]thio]-2-(2-

21: DL-3-[[(1,2,4-thiadiazol-5-yl)thio]methyl]-7β-[[[[(n-propylthio)carbonyl]thio]acetyl]amino]-8-oxo-5-thia-1-azabicyclo[4.2.0]oct-2-ene-2-carboxylic acid, trimethylsilyl ester.

22: DL-3-[[(1,2,4-thiadiazol-3-yl)thio]methyl]-7β-[[[[(methylthio)carbonyl]thio]phenylacetyl]amino]-8-oxo-5-thia-1-azabicyclo[4.2.0]oct-2-ene-2-carboxylic acid.

23: DL-3-[[(5-butyl-1,2,4-thiadiazol-3-yl)thio]methyl]-7β-[[[[(methylthio)carbonyl]thio]acetyl]amino]-8-oxo-5-thia-1-azabicyclo[4.2.0]oct-2-ene-2-carboxylic acid.

24: DL-3-[(methylthio)methyl]-7β-[DL-2-[[[(methylthio)carbonyl]thio]phenylacetyl]amino]-8-oxo-5-thia-1-azabicyclo[4.2.0]oct-2-ene-2-carboxylic acid methyl ester.

25: DL-3-[(ethylthio)methyl]-7β-[[[[(methylthio)carbonyl]thio]phenylacetyl]amino]-8-oxo-5-thia-1-azabicyclo-[4.2.0]oct-2-ene-2-carboxylic acid.

26: DL-3-[(methylthio)methyl]-7β-[[[[(methylthio)carbonyl]thio]acetyl]amino]-8-oxo-5-thia-1-azabicyclo[4.2.0]oct-2-ene-2-carboxylic acid and sodium salt.

27: DL-3-[(ethylthio)methyl]-7β-[[[[(ethylthio)carbonyl]-thio]acetyl]amino]-8-oxo-5-thia-1-azabicyclo[4.2.0]oct-2-ene-2-carboxylic acid and triethylamine salt.

28: DL-3-[(methylthio)methyl]-7β-[[[[(methylthio)carbonyl]thio]-2-(2-thienyl)acetyl]amino]-8-oxo-5-thia-1-azabicyclo[4.2.0]oct-2-ene-2-carboxylic acid, benzhydryl ester.

29: DL-3-[(ethylthio)methyl]-7β-[[[[(methylthio)carbonyl]thio]-2-(3-furyl)acetyl]amino]-8-oxo-5-thia-1-azabicyclo[4.2.0]oct-2-ene-2-carboxylic acid.

30: DL-3-[(methylthio)methyl]-7β-[[[[(methylthio)carbonyl]thio]-2-(2-pyridyl)acetyl]amino]-8-oxo-5-thia-1-azabicyclo[4.2.0]oct-2-ene-2-carboxylic acid.

31: DL-3-[(propylthio)methyl]-7β-[[[[(methylthio)carbonyl]thio]phenylacetyl]amino]-8-oxo-5-thia-1-azabicyclo[4.2.0]oct-2-ene-2-carboxylic acid.

32: DL-3-[[(1-ethyl-1H-tetrazol-5-yl)thio]methyl]-7β-[[[[(ethylthio)carbonyl]thio]-2-(2-pyridyl)-acetyl]amino]-8-oxo-5-thia-1-azabicyclo[4.2.-0]oct-2-ene-2-carboxylic acid and potassium salt.

33: DL-3-[[(1H-tetrazol-5-yl)thio]methyl]-7β-[[[[(methylthio)carbonyl]thio]acetyl]amino]-8-oxo-5-thia-1-azabicyclo[4.2.0]oct-2-ene-2-carboxylic acid.

34: DL-3-[[(1-methyl-1H-tetrazol-5-yl)thio]methyl]-7β-[[[[(ethylthio)carbonyl]thio]-2-(2-furyl)acetyl]amino]-8-oxo-5-thia-1-azabicyclo[4.2.0]oct-2-ene-2-carboxylic acid and potassium salt.

35: DL-3-[[(1-methyl-1H-tetrazol-5-yl)thio]methyl]-7β-[2-[[[(methylthio)carbonyl]thio]-2-(3-thienyl)acetyl]amino]-8-oxo-5-thia-1-azabicyclo[4.2.0]oct-2-ene2-carboxylic acid pivaloyloxymethyl ester.

36: DL-3-[[(1-ethyl-1H-tetrazol-5-yl)thio]methlyl-7β-[[[[(ethylthio)carbonyl]thioi]acetyl]amino]-8-oxo-5-thia-1-azabicyclo[4.2.0]oct-2-ene-2-carboxylic acid.

37: DL-3-[[(1H-tetrazol-5-yl)thio]methyl]-7β-[2-[[[n-butylthio)carbonyl]thio]acetyl]amino]-8-oxo-5-thia-1-azabicyclo[4.2.0]oct-2-ene-2-carboxylic acid.

38: DL-3-[[(3-methyl-1,2,4-thiadiazol-5-yl)thio]methyl]-7β-[[[[(methylthio)carbonyl]thio]-phenylacetyl]amino]-8-oxo-5-thia-1-azabicyclo[4.2.0]oct-2-ene-2-carboxylic acid.

39: DL-3-[[(1,2,4-thiadiazol-3-yl)thio]methyl-7β-[[[2-[(methylthio)carbonyl]thio]propionyl]amino]-8-oxo-5-thia-1-azabicyclo[4.2.0]oct-2-ene-2-carboxylic acid pivaloyloxymethyl ester.

40: DL-3-[[(1H-tetrazol-5-yl)thio]methyl]-7β-[[[2-[(ethylthio)carbonyl]thio]propionyl]amino]-8-oxo-5-thia-1-azabicyclo[4.2.0]oct-2-ene-2-carboxylic acid.

41: DL-3-[[(1-methyl-1H-tetrazol-5-yl)thio]methyl]-7β-[[[2-[(methylthio)carbonyl]thio]-butyryl]amino]-8-oxo-5-thia-1-azabicyclo[4.2.-0]oct-2-ene-2-carboxylic acid and potassium salt.

What is claimed is:
1. A compound of the formula

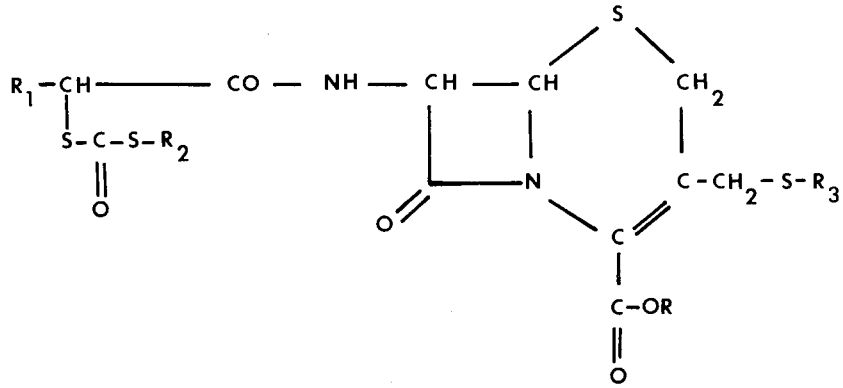

wherein R is hydrogen, lower alkyl, phenyl-lower alkyl, benzhydryl, tri(lower alkyl)stannyl, tri(lower alkyl)silyl, —CH₂—OCO—R₄, alkali metal, alkaline earth metal, mono(lower alkyl amine) salt or tri(lower alkylamine) salt; R₁ is hydrogen, lower alkyl, phenyl, pyridyl, thienyl or furyl; R₂ is lower alkyl; R₃ is a five membered heterocyclic of the group thiadiazole, triazole, tetrazole and the lower alkyl substituted members of said heterocyclics; and R₄ is lower alkyl, phenyl, phenyl-lower alkyl or benzhydryl; said lower alkyl groups having one to seven carbons.

2. A compound as in claim 1 wherein R is hydrogen, alkali metal, trimethylsilyl or

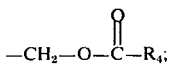

R₁ is hydrogen, lower alkyl or phenyl; R₂ is lower alkyl;

$R_3$ is tetrazole or (lower alkyl)tetrazole; and $R_4$ is methyl or t-butyl.

3. A compound as in claim 1 wherein $R_1$ is phenyl.

4. A compound as in claim 3 wherein $R_2$ is lower alkyl and $R_3$ is (lower alkyl)tetrazole.

5. A compound as in claim 4 wherein each lower alkyl group is methyl.

6. A compound as in claim 1 wherein $R_3$ is 1-lower alkyl-1H-tetrazol-5-yl.

7. A compound as in claim 1 wherein R is hydrogen, $R_1$ is phenyl, $R_2$ is methyl and $R_3$ is 1-methyl-1H-tetrazol-5-yl.

8. Alkali metal salt of the compound of claim 5.

9. A compound as in claim 8 wherein the alkali metal is potassium.

10. A compound as in claim 1 wherein R is hydrogen, $R_1$ is phenyl, $R_2$ is methyl and $R_3$ is 3-methyl-1,2,4-thiadiazol-5-yl.

* * * * *